(12) United States Patent
Van Bekkum

(10) Patent No.: US 8,826,717 B2
(45) Date of Patent: Sep. 9, 2014

(54) SMALL VOLUME PROVER APPARATUS AND METHOD FOR PROVIDING VARIABLE VOLUME CALIBRATION

(75) Inventor: Frank Van Bekkum, Norcross, GA (US)

(73) Assignee: Honeywell International Inc., Morristown, NJ (US)

( * ) Notice: Subject to any disclaimer, the term of this patent is extended or adjusted under 35 U.S.C. 154(b) by 129 days.

(21) Appl. No.: 13/088,002

(22) Filed: Apr. 15, 2011

(65) Prior Publication Data

US 2012/0260717 A1    Oct. 18, 2012

(51) Int. Cl.
*G01F 25/00* (2006.01)

(52) U.S. Cl.
CPC .................................. *G01F 25/0015* (2013.01)
USPC ........................................................... 73/1.22

(58) Field of Classification Search
None
See application file for complete search history.

(56) References Cited

U.S. PATENT DOCUMENTS

| | | | | |
|---|---|---|---|---|
| 4,637,244 | A | * | 1/1987 | Maurer et al. ................. 73/1.22 |
| 5,076,093 | A | * | 12/1991 | Jones et al. .................... 73/1.22 |
| 5,317,895 | A | | 6/1994 | Ogawa et al. |
| 5,392,632 | A | | 2/1995 | Umeda et al. |
| 5,526,674 | A | * | 6/1996 | Korpi ............................. 73/1.21 |
| 6,763,731 | B1 | | 7/2004 | Padden |
| 2007/0169537 | A1 | | 7/2007 | Cotton |
| 2008/0083262 | A1 | | 4/2008 | Augenstein et al. |
| 2010/0241387 | A1 | | 9/2010 | Ignatian |

FOREIGN PATENT DOCUMENTS

| | | |
|---|---|---|
| GB | 2 250 824 A | 6/1992 |
| WO | WO 2010/109167 A1 | 9/2010 |

OTHER PUBLICATIONS

Lee, G. D., "Series 1—Small Volume Provers: Identification, Terminology and Definitions," Mar. 2005. 5 pages.
Lee, D., "Part 2—Small Volume Provers History, Design, and Operation," Jun. 2005, 6 pages.
Lee, G. D., "Small Volume Prover (SVP) Proving Reports," Mar. 2006, 6 pages.
Whiteman, S. K., "Operational Experiences Proving Mass Flow Meters with Small Volume Provers," *Energy Week Conference and Exhibition* Feb. 1, 1996, 6 pages.
EP Search Report for EP 12163212.9 dated Aug. 21, 2012.

* cited by examiner

*Primary Examiner* — Robert R Raevis
(74) *Attorney, Agent, or Firm* — Tuesday A. Kaasch; Kermit D. Lopez; Luis M. Ortiz

(57) ABSTRACT

A small volume prover (SVP) apparatus and method for providing variable volume calibration. The apparatus includes a precision bore cylinder and a piston configured with a valve arrangement in order to permit fluid to pass through an annular passage when the piston is traveling from one position to an opposite position. A position sensor and a pair of optical slot detectors can be integrated in association with the piston for continuously sensing an accurate position and stroke of the piston. The position sensor verifies the optical slot detectors at every run and provides calibration of flexible volumes as the fluid travels via the annular passage. The position sensor also checks the correct return of the piston after the flow stroke and detects the stuck mechanics. Such small volume prover apparatus associated with the position sensor can be employed for precise and fast position sensing of the piston and variable volume calibration of a fluid flow sensor.

17 Claims, 3 Drawing Sheets

SMALL VOLUME PROVER APPARATUS AND METHOD FOR PROVIDING VARIABLE VOLUME CALIBRATION

TECHNICAL FIELD

Embodiments are generally related to flow meter proving systems and methods. Embodiments are also related to small volume provers. Embodiments are additionally related to linear position sensors. Embodiments are further related to the provision of variable volume calibration.

BACKGROUND OF THE INVENTION

Meter provers and flow providing components provide a known traceable volume to simulate actual operating conditions and to test and verify the performance of a flow meter. Small volume provers (SVP) can be employed in an oil and gas industry to calibrate a flow measurement device employed in a custody transfer, pipe lines, etc. Small volume provers generally include a precisely honed cylinder with sensors to detect the beginning and end of a stroke of a piston. The volume of the stroke can then be employed to verify the volume measured by the device under test.

Conventional small volume provers for calibration of a liquid flow sensor measure a fixed volume, typically by utilizing a pair of fixed position optical slot detectors on the piston of the small volume prover. Such prior art small volume provers can only be employed to verify a fixed volume related to size of the small volume provers such as cylinder diameter and stroke (piston) length. Additionally, a test tank (e.g., seraphin) must have an exact volume matching the size of the small volume prover for verification of accuracy of the small volume prover. Furthermore, if the optical slot detectors are replaced after maintenance, the unit needs to be recalibrated.

Based on the foregoing, it is believed that a need exists for an improved small volume prover apparatus and method for providing variable volume calibration. A need also exists for an improved position sensor for monitoring position and movement of a piston, as described in greater detail herein.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved meter proving systems and methods.

It is another aspect of the disclosed embodiments to provide for an improved small volume prover apparatus and method for providing variable volume calibration.

It is a further aspect of the disclosed embodiments to provide for an improved position sensor for monitoring position and movement of a piston.

The aforementioned aspects and other objectives and advantages can now be achieved as described herein. A small volume prover (SVP) apparatus and method for providing variable volume calibration is disclosed herein. The apparatus includes a precision bore cylinder and a piston configured with a valve arrangement in order to permit fluid to pass through an annular passage when the piston is traveling from one position to an opposite position. A position sensor and a pair of optical slot detectors can be integrated in association with the piston for continuously sensing an accurate position and stroke of the piston. The position sensor verifies the optical slot detectors at every run and provides calibration of flexible volumes as the fluid travels via the annular passage. The position sensor also checks the correct return of the piston after the flow stroke and detects any stuck mechanics. Such small volume prover apparatus associated with the position sensor can be employed for precise and fast position sensing of the piston and variable volume calibration of a fluid flow sensor.

The apparatus can be configured with a pair of temperature and pressure measurement devices, which are utilized for correction of the measured quantity. That is, temperature is utilized to correct for the thermal expansion of the cylinder and bar with sensors and also for the thermal expansion of the liquid. Pressure is utilized mainly for the compressibility of the liquid (e.g., hydrocarbons are compressible). These can be accomplished via a computing device such as, for example, a flow computer.

A processor configured in association with the apparatus for calibrating the fluid flow utilizing a double chronometry pulse interpolation that provides a fractional meter pulse counting. A proving run can be initiated via interaction with the processor, which can function together to generate a signal to a motor to pull the piston into an upstream position. The piston can then be unlatched from a chain drive return mechanism. The low-drag piston traveling down the tube is free to follow the flow of the fluid with the least possible effect on the flow stream. When the piston is released, the flow-through valve closes by a spring tension and the piston velocity is synchronized with the fluid velocity. The precision optical slot detectors can be actuated if the piston is released after a short run.

A signal can be transmitted to the processor to initiate a timing sequence when the linear sensor and the first optical slot detectors is actuated after the piston has been released and synchronized with the fluid flow. Upon reaching the end of the linear sensor and the optical slot detectors, a signal can be transmitted to the processor to stop the timing sequence. The piston can be stopped mechanically after passing the end of the linear sensor and the optical slot detector. The fluid pressure in the apparatus pushes the perimeter of the piston further downstream, opening the flow-through valve, thereby permitting the flow to continue with little to no pulsation or surge in line pressure. The motor can be started electronically to pull the piston back upstream if the processor requires more passes. The position sensor monitors a smooth operation of the prover apparatus and detects an interrupted batch. The piston travels at the same rate of the liquid and trips the position sensors in order to determine a measure of flow rate. Such an apparatus associated with the position sensor can perform recalibration and real time verification of the switch points, and monitors smooth stroke, speed of filling, and retraction.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate at least one embodiment and are not intended to limit the scope thereof.

The embodiments now will be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
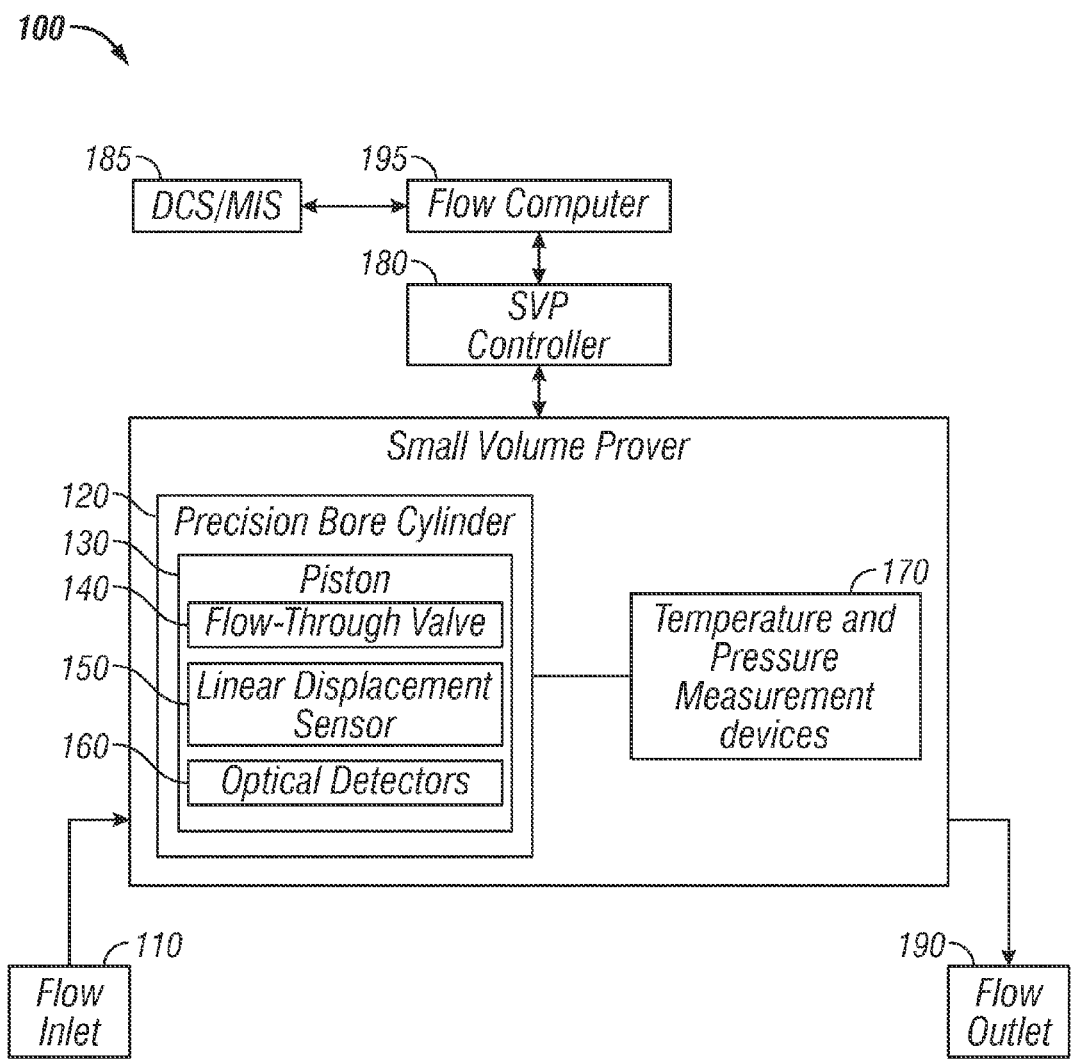
FIG. 1 illustrates a block diagram of a small volume prover apparatus, in accordance with the disclosed embodiments.

FIG. 1 illustrates a block diagram of a small volume prover apparatus 100, in accordance with the disclosed embodiments. The small volume prover apparatus 100 provides a simple mechanical operation, with no hydraulics or pneumatics, and equal upstream and downstream volumes. The apparatus 100 provides a constant temperature of the fluid stream maintaining a constant base volume of a measuring conduit by minimizing a differential pressure of fluids in and around the measuring conduit. The apparatus 100 employs an electronic pulse-counting technique such as, for example, a double chronometry for calibrating the flow rate of a fluid.

The apparatus 100 includes a precision bore cylinder 120 having a flow inlet 110 and a flow outlet 190. The precision bore cylinder 120 houses a piston 130 configured with a flow-through valve 140 in order to permit fluid to pass through the piston when open. When the flow-through valve 140 is closed, the piston is pushed along an annular passage by the flow of fluid from one position to an opposite position. A position sensor 150 and a pair of optical slot detectors 160 can be operably connected to the piston 130 continuously sensing an accurate position and stroke of the piston 130. Note that the position sensor 150 can include, for example, a linear displacement sensor such as a magnetostrictive linear position sensor. The position sensor 150 can also be implemented in some embodiments as rotational-type device rather than a linear position type mechanism. The position sensor 150 assists generally in measuring the position of the piston 130. Note that one of the advantages of linear piston measurement is that it is possible to continuously monitor the movement of the piston. During the measurement stroke, it is then representative for the flow and during the retrieval it can provide information with respect to the drive system.

The apparatus 100 further includes a pair of temperature and pressure measurement devices 170, which are utilized for correction of the measured quantity. That is, temperature is utilized to correct for the thermal expansion of the cylinder 120 and bar with sensors and also for the thermal expansion of the liquid. Pressure is utilized mainly for the compressibility of the liquid (e.g., hydrocarbons are compressible). These can be accomplished via a computing device such as, for example, a flow computer. The precision bore cylinder 120 has a known volume, which can be verified in a laboratory utilizing a water draw procedure.

The piston 130 moves with the same flow as the liquid between the two detectors 160 and the position sensor 150, and the time taken by the piston 130 to travel through the position sensor 150 provides a measure of flow rate. The piston 130 can be made of material that is appropriate for the prover operating pressure, temperature, and the desired resistance to degradation by the liquid that is being metered. The flow-through valve 140 can be located inside the piston 130 that permits fluid to flow through. The valve 140 is closed when the piston 130 moves from upstream to downstream position. The valve 140 is open when the piston 130 moves from downstream to the upstream position.

The piston 130 can be positioned and launched via a chain drive mechanism and/or a hydraulic mechanism. In a chain drive mechanism, a standby mode for the piston 130 is the downstream position with the valve 140 open. The chain mechanism pulls the piston 130 to the upstream position, the piston 130 is released, and the valve 140 doses to start a proving run.

The piston 130 can trip the optical detectors 160 as it travels the length of the calibrated section (precision bore cylinder) of the prover apparatus 100. Note that the detectors 160 are optical sensors or electrical switches employed to start and stop counters and determine the calibrated section of the prover apparatus 100. The temperature and pressure measurements can be made during the proving run by the temperature and pressure measurement devices 170. The liquid can be passed through the apparatus 100 until the temperature and pressure is stabilized. A processor or SVP (Small Volume Prover) controller 180 can be configured in association with the apparatus 100 for processing dual chronometry pulse interpolation. The SVP controller 180 can be a data processing system such as, for example, desktops, network devices, laptops, tablet computing devices, servers, and so forth.

The pulse interpolation is a pulse counting technique employed to calculate the total number of meter pulses between the two detectors 160, including fractional pulses. The precision bore cylinder 120 is the measurement chamber of the apparatus 100. The piston 130 traveling at the same rate of the liquid, trips the detectors 160 in order to determine a measure of flow rate. The position sensor 150 verifies the optical slot detectors 160 at every run and provides calibration of flexible volumes as the fluid travels via the annular passage. The position sensor also checks the correct return of the piston 130 after the flow stroke and detects the stuck mechanics. The position sensor 150 also monitors a smooth operation of the prover apparatus 100 by detecting an interrupted batch with respect to the piston 130. Such small volume prover apparatus 100 associated with the position sensor 150 can be employed for accurate variable volume calibration of a fluid flow sensor.

Note that a flow computer 195 can also be utilized in association with system 100. The flow computer 195 communicates with the SVP controller 180. The flow computer 195 can also communicate with, for example, the temperature and pressure sensor 170 and the optical detector(s) 160. Thus, signals from the optical detector(s) 160 can be provided to the external flow computer 195. Additionally, the measured pressure and temperature provided by the temperature and pressure sensor 170 can be processed by the flow computer 195. Calculations can be performed, for example, in accordance with API/ASTM methods utilized in industry. Flow computer 195 can be implemented in some embodiments as, for example, an "omni" type device. Examples include, but are not limited to, the OMNI 3000 and OMNI 6000 Row Computers provided by OMNI Row Computers, Inc. of Sugar Land, Tex., U.S.A.

The SVP controller 180 also communicates with the optical detector(s) 160 and receives optical signals from the optical detector(s) 160, and pressure and temperature data, along with the linear position input, and can then provide alternative outputs to the flow computer 195 with "emulated" start and stop signals (for other volumes), which control the motor (i.e., to start and stop for the next cycle). The SVP controller 180 can also monitor correct function, etc., and provide status output data to the flow computer 195, such as, for example, data indicative "excessive vibration," "non-constant flow detected," "maintenance required," and the like.

The flow computer 195 can also be connected to a DCS (Distributed Control System) or other MIS (Management Information System) 185 for printing receipts such as, for example, a BOL (Bill of Lading). Note that a DCS is typically a control system of a manufacturing system, process or any type of dynamic system, which the controller elements are not central in location (e.g., like the brain), but are distributed throughout the system with each component sub-system controlled by one or more controllers. The entire system of controllers can be connected by networks for communication and monitoring. A MIS, on the other hand, typically refers to a management information system that provides information for managing organizations effectively. A MIS usually involves three primary resources: technology, information, and people. Management information systems are regarded to be a subset of the overall internal controls procedures in a business, which cover the application of people, documents, technologies, and procedures used by, for example, management accountants to solve business problems such as costing a product, service or a business-wide strategy. Management information systems are distinct from regular information systems in that they are used to analyze other information systems applied in operational activities in the organization. Academically, the term MIS is commonly used to refer to the group of information management methods tied to the automation or support of human decision making, e.g. Decision Support Systems, Expert systems, and Executive information systems.

Figure 2:
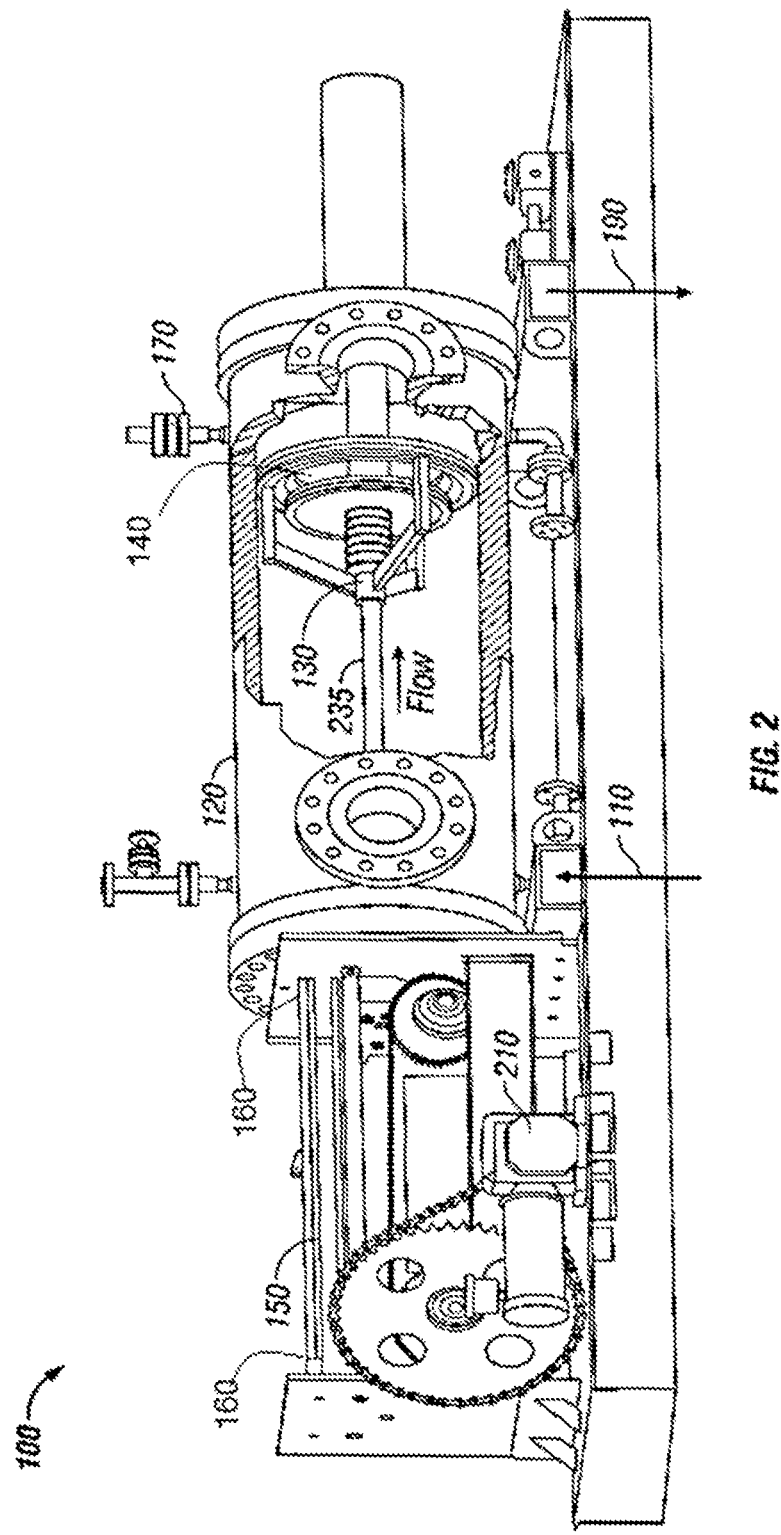
FIG. 2 illustrates a perspective view of the small volume prover apparatus associated with a position sensor, in accordance with the disclosed embodiments.

FIG. 2 illustrates a perspective view of the small volume prover apparatus 100 associated with the position sensor 150 for variable volume calibration, in accordance with the disclosed embodiments. Note that in FIGS. 1-3, identical or similar blocks are generally indicated by identical reference numerals. The cylinder 120 and the piston 130 can be driven in rectilinear fashion by a programmable variable speed motor 210 such as a servomotor. The motor 210 can be rotated to vertically move a piston rod 235 in either direction depending on the direction of the motor 210 rotations. The precise position of the piston rod 235 and therefore the piston 130 can be monitored by the high precision position sensor 150. The position sensor 150 can be, for example, a magnetostrictive linear position sensor for fast and accurate position sensing of the piston 130, depending upon design considerations. The accuracy of the position sensor 150 can be in the micron range and many kHz refresh rate are possible for providing the required time/position resolution.

A proving run can be initiated via interaction with the processor or SVP controller 180, which can signal the motor 210 to pull the piston 130 into an upstream position. The piston 130 can then be unlatched from a chain drive return mechanism. The low-drag piston 130 traveling down the tube is free to follow the flow of the fluid with the least possible effect on the flow stream. When the piston 130 is released, the flow-Through valve 140 closes by a spring tension and the piston velocity is synchronized with the fluid velocity. The precision optical slot detectors can be actuated if the piston 130 is released after a short run.

A signal can be transmitted to the SVP controller 180 to start a timing sequence when the position v 150 and the optical slot detectors 160 is actuated after the piston 130 has been released and synchronized with the fluid flow. Upon reaching the end of the position sensor 150 and the optical slot detectors 160, a signal can be transmitted to the SVP controller 180 to stop the timing sequence. The piston 130 can be stopped mechanically after passing the end of the position sensor 150 and the optical slot detector 160. The fluid pressure in the apparatus 100 pushes the perimeter of the piston 130 further downstream, opening the flow-through valve 140, thereby permitting the flow to continue with little to no pulsation or surge in line pressure. The motor 210 can be started electronically to pull the piston 130 back upstream if the SVP controller 180 requires more passes.

The apparatus 100 can calculate the variable volume utilizing the double chronometry approach. The double chronometry approach provides fractional meter pulse counting for calibrating the fluid flow rate. The double chronometry approach provides exact time discrimination and pulse counting for achieving higher accuracy in calibration of the fluid flow. The measurement of fluid flow, temperature, pressure, and the position of the piston 130 can be determined utilizing the SVP controller 180 associated with the apparatus 100. The position sensor 150 monitors the smooth operation of the prover apparatus 100 and checks the correct return of the piston 130 after flow stroke. Such an apparatus 100 associated with the position sensor 150 can perform recalibration and real time verification of the switch points and monitors smooth stroke, speed of filling, and retraction.

Figure 3:
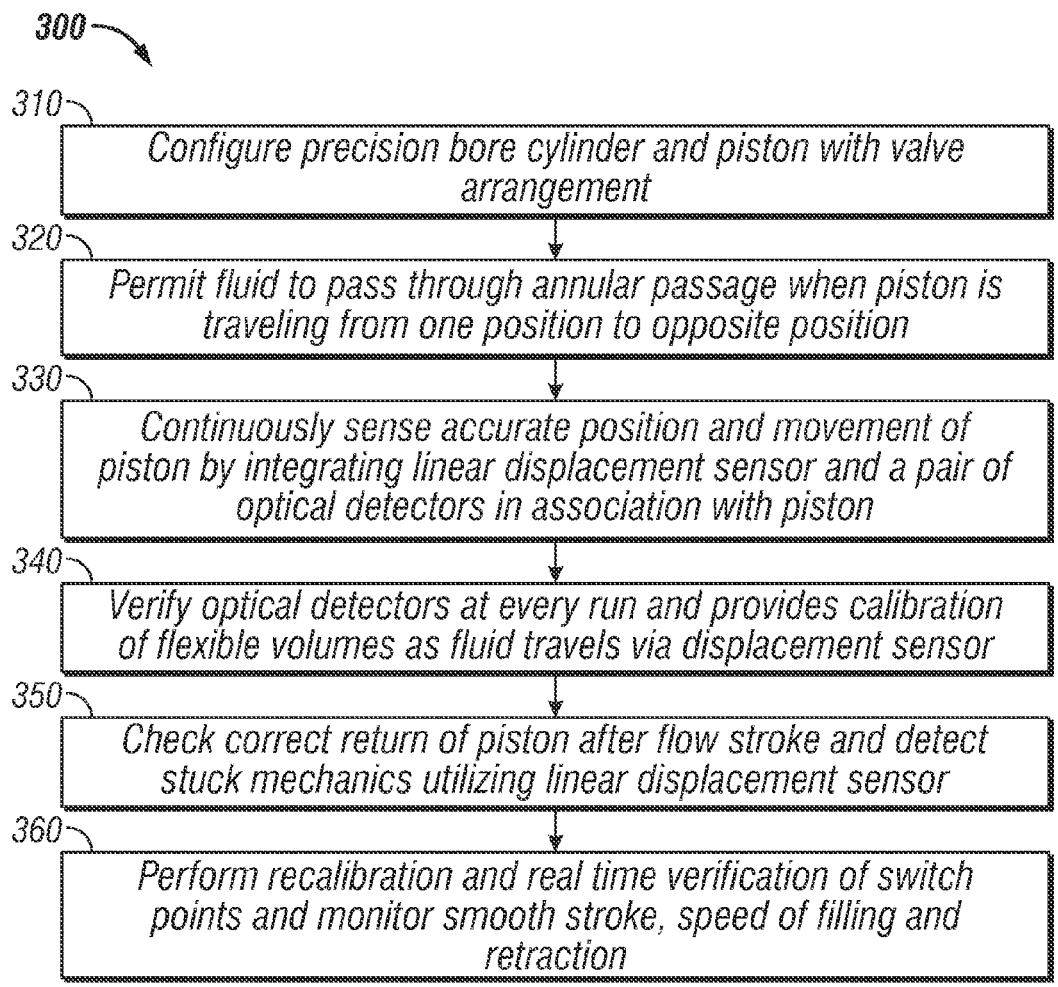
FIG. 3 illustrates a high level flow chart of operation illustrating logical operational steps of a method for providing variable volume calibration utilizing the position sensor, in accordance with the disclosed embodiments.

FIG. 3 illustrates a high level flow chart of operation illustrating logical operational steps of a method 300 for providing variable volume calibration utilizing the position sensor 150, in accordance with the disclosed embodiments. The precision bore cylinder 120 and the piston 130 can be configured with the valve arrangement 140, as illustrated at block 310. A fluid can be permitted to pass through an annular passage when the piston 130 is traveling from one position to an opposite position, as depicted at block 320. An accurate position and stroke of the piston 130 can be continuously sensed by integrating the position sensor 150 and the pair of optical detectors 160 in association with the piston 130, as indicated at block 330. The optical detectors 160 can be verified at every run and the calibration of flexible volumes can be provided as fluid travels the position sensor 150, as illustrated at block 340. The position sensor 150 also checks the correct return of the piston 130 after flow stroke and detects the stuck mechanics, as depicted at block 350. The recalibration and real time verification of switch points can be performed and smooth stroke, speed of filling, and retraction can be monitored by the position sensor 150, as indicated at block 360.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A small volume prover apparatus, said apparatus comprising:
a bore cylinder having a chamber housing a piston configured with a valve in order to permit fluid to pass through said piston when open and to allow fluid to push said piston through said chamber when closed in order to determine a measure of flow rate; and
a position sensor and a pair of optical slot detectors, wherein said position sensor verifies said optical slot detectors and provides calibration of flexible volumes as said fluid travels through said chamber.

2. The apparatus of claim 1 further comprising a pair of temperature and pressure measurement devices operably connected to said bore cylinder for measuring pressure and temperature within said chamber.

3. The apparatus of claim 1 further comprising a processor for receiving signals from said position sensor for calibrating said fluid flow utilizing a double chronometry pulse interpolation that provides a fractional meter pulse counting.

4. The apparatus of claim 3 wherein said position sensor is a magnetostrictive linear position sensor.

5. The apparatus of claim 3 wherein said position sensor identifies a correct return of said piston after a flow stroke and determines if mechanical components are immobile.

6. The apparatus of claim 3 wherein said position sensor monitors an operation of said prover apparatus by detecting any interruptions in the movement of said piston.

7. A small volume prover system, said system comprising:
a precision bore cylinder that houses a piston configured with a valve in order to permit fluid to pass through said piston when open and to allow fluid to push said piston through said chamber when closed in order to determine a measure of flow rate; and
a position sensor operably connected to said piston wherein said position sensor includes a magnetostrictive linear displacement sensor for continuously sensing an accurate position and stroke of said piston, wherein said linear displacement sensor monitors an operation of said prover system by detecting any interruptions in a movement of said piston and wherein said position sensor identifies a correct return of said piston after a flow stroke and determines if mechanical components are immobile.

8. The system of claim 7 further comprising a pair of temperature and pressure measurement devices operably connected to said bore cylinder for measuring pressure and temperature within said chamber.

9. The system of claim 8 further comprising an SVP controller for receiving signals from said linear displacement sensor to calibrate said fluid flow utilizing a double chronometry pulse interpolation that provides a fractional meter pulse counting.

10. A small volume prover method, comprising:
passing fluid through an annular passage associated with a precision bore cylinder that houses a piston having a valve;
continuously sensing an accurate position and movement of said piston by a linear displacement sensor operably connected to said piston; and
monitoring an operation of said prover apparatus in order to thereafter check a correct return of said piston after a flow stroke thereby providing an accurate variable volume calibration of a fluid flow sensor; and
performing a recalibration and real time verification of a switch point in order to monitor a smooth stroke of said piston and speed of filing and retraction.

11. The method of claim 10 further comprising measuring pressure and temperature within said precision bore cylinder utilizing a pair of temperature and pressure measurement devices.

12. The method of claim 10 further comprising calibrating said fluid flow utilizing a double chronometry approach that provides a fractional meter pulse counting.

13. The method of claim 10 further comprising:
initiating a proving run via interaction with a processor; and
signaling a motor to pull said piston into an upstream position in order to unlatch said piston from a chain drive return mechanism.

14. The method of claim 13 further comprising:
transmitting a signal to a processor to initiate a timing sequence when said linear displacement sensor is actuated after said piston is released and synchronized with said fluid flow; and
closing said flow-through valve located inside said piston during movement of said piston from an upstream to a downstream position with velocity of said fluid, displacing a certified volume.

15. The method of claim 14 further comprising:
transmitting a signal to said processor to stop said timing sequence upon reaching an end of said linear displacement sensor; and
opening said flow-through valve when said valve moves from said downstream to said upstream position in order to permit said fluid to flow freely through said cylinder with an insignificant pressure loss.

16. The method of claim 13 further comprising:
identifying a correct return of said piston after a flow stroke; and
determining if mechanical components are immobile.

17. The method of claim 10 wherein said linear displacement sensor is a magnetostrictive linear position sensor.

* * * * *